Patented Sept. 29, 1942

2,296,938

UNITED STATES PATENT OFFICE 2,296,938

WELDING ROD AND METHOD OF MANUFACTURING WELDING RODS

Arthur R. Lytle, Niagara Falls, N. Y., assignor to Electro Metallurgical Company, a corporation of West Virginia No Drawing. Application November 20, 1940, Serial No. 366,379

6 Claims. (Cl. 219—8)

This invention relates to welding rods and refers more particularly to an improved method of manufacturing steel welding rods.

The value of a steel welding rod is dependent on the properties of the weld deposit produced from it. The weld deposit must be strong, tough, ductile, appropriately hard for its conditions of service, clean, and sound. But, even more important than the degree of toughness, ductility, hardness, and strength is the necessity that the deposit be uniform in these properties. Also, the welding rod itself must be of such composition that it has good welding characteristics so that it flows easily and makes possible the production of clean, sound deposits.

These required characteristics of welding rod and weld deposit are met to a high degree by many welding rods now on the market. But the increasing use of welding leads to the adoption of more rigorous specifications of desired properties in weld deposits, and improvements in such properties are constantly sought.

It is the principal object of this invention to improve the method of manufacture of steel welding rods so as to provide rods which, when used for welding, produce deposits of weld metal of improved uniformity in properties. This object is achieved by the invention which is based on the discovery that enhanced uniformity in the properties of deposited steel weld metal may be attained by a special treatment of the steel from which the welding rod is made in the manner described below.

As is well known, steel during manufacture is contaminated with oxides and gases which must be removed or made harmless to prevent them from detrimentally affecting the steel. The detrimental effects of such impurities are usually overcome by additions to the steel of ferrosilicon or ferromanganese for the purpose of deoxidation. Further deoxidation is attained by later additions of aluminum which also serve to inhibit grain growth of the steel. This treatment with aluminum, however, introduces non-metallic inclusions of undesirable kind and quality, and undesirably present in relatively large clusters throughout the steel. It is the presence of such inclusions which may detrimentally affect the uniformity of physical properties of steel weld deposits produced from welding rods composed of steel manufactured in the usual way.

The invention comprises the improvement in the manufacture of steel welding rods which consists in treating a molten steel from which welding rods are to be made with a ferrosilicon associated with one or more elements of the group consisting of titanium, vanadium, and zirconium and at least one element of the group consisting of aluminum and calcium, the aggregate proportion of the elements of such groups being sufficient to affect favorably the amount, kind, and distribution of inclusions in the steel and thereby to provide a steel which when deposited from a welding rod is uniform in physical properties. The ferrosilicon alloy may also contain boron or beryllium or both. Also included in the invention is a steel welding rod which produces a fine-grained deposit substantially free from deleterious impurities, which rod has been made from a steel treated in the manner just described.

In accordance with the invention, there is added to a molten steel to be used in the manufacture of welding rods a sufficient quantity of a ferrosilicon containing, in addition to iron, 25% to 65% silicon, a total of 3% to 30% of one or more elements of the group titanium, zirconium, and vanadium, and 1% to 20% of at least one element of the group consisting of aluminum and calcium. The addition agent may also contain 0.1% to 5% of boron or beryllium or both. Excellent results may be obtained by the use of an alloy containing 25% to 65% silicon, 1% to 15% aluminum, 1% to 20% titanium or zirconium or both, 5% to 20% vanadium, the remainder iron, the aggregate of the titanium or zirconium and vanadium being between about 3% and 30%. Another highly satisfactory alloy is one containing 25% to 65% silicon, an aggregate of 1% to 20% calcium and aluminum, 5% to 25% of titanium or zirconium, remainder iron.

The treatment just described may be given to the molten steel in the furnace, in the ladle or in the stream during pouring. Preferably, it is carried out immediately before pouring. While it is preferred that the addition agent used be an alloy, it is possible to use a mixture of the necessary elements in the desired proportions. However, the addition of all the elements should be made simultaneously. Generally, sufficient addition agent is used to increase the silicon content of the steel by about 0.25%. Ordinarily the total amount of agent added should be less than about 5%.

It has been found by experiment that welding rods produced from steels which have been treated with an agent of the kind described have improved flowing characteristics when used for welding and produce sound, clean deposits of weld metal. Moreover, deposits of weld metal produced from welding rods made from steel treated in accordance with the invention exhibit substantially greater uniformity in physical properties than weld deposits produced from welding rods of substantially the same composition but made from steels not treated in accordance with the invention.

For example, in a typical test deposits of weld metal were produced on a railway rail from welding rods some of which were made of steel treated in accordance with the invention and some of which were made of steel not so treated. The surface of the weld deposits was ground smooth and nine regularly spaced Brinell hardness tests were made on the deposits. In the deposit produced from a welding rod made from a steel treated in accordance with the invention, of the nine hardness tests the same value was obtained six times. In the case of a deposit of substantially the same composition but produced from a welding rod made from a steel not treated in accordance with the invention, of the nine hardness tests made, the same value was obtained only three times.

In further tests weld deposits of different composition were produced and tested for hardness. In the case of a deposit produced from a welding rod made of a steel treated according to the invention the range from the lowest Brinell hardness value to the highest Brinell hardness value was 43. In a similar deposit produced from a welding rod made from a steel not treated in accordance with the invention the range between the lowest hardness value and the highest hardness value was 85.

In conducting these welding tests it was observed that the welding characteristics of rods produced from steel treated in accordance with the invention are considerably better than the welding characteristics of rods produced from steels not treated in accordance with the invention. For example, the slag produced from the specially treated welding rod has a creamy consistency, covers the molten puddle with a uniform, thin film and has practically no tendency to become entrapped in the molten metal. Because of these characteristics, the weld deposit is produced more rapidly and is substantially cleaner and sounder than deposits produced from welding rods of substantially the same composition made from steel not treated in accordance with the invention.

The invention may be applied advantageously to the manufacture of plain carbon steel welding rods and to the manufacture of the so called low alloy steel welding rods containing chromium or other elements. Where a low alloy steel welding rod is to be produced the alloying element or elements may be added to the steel at the same time as the special addition agent.

While specific examples of the application of the invention have been cited, these examples are by way of illustration merely and the invention is not limited to or by them.

I claim:

1. In the process of manufacturing steel welding rods which comprises the steps of preparing a bath of molten steel of substantially the desired composition; deoxidizing the molten bath; and casting the deoxidized steel, the method of imparting to the rods the characteristic of forming weld-deposits of enhanced uniformity of physical properties throughout which comprises adding to the molten steel during said deoxidizing step a small amount of an agent containing 25% to 65% silicon; at least one element selected from the group consisting of titanium, zirconium and vanadium in an aggregate percentage between 3% and 30%; and at least one element selected from the group consisting of aluminum and calcium in an aggregate percentage between 1% and 20%; the remainder principally iron.

2. In the process of manufacturing steel welding rods which comprises the steps of preparing a bath of molten steel of substantially the desired composition; deoxidizing the molten bath; and casting the deoxidized steel, the method of imparting to the rods the characteristic of forming weld-deposits of enhanced uniformity of physical properties throughout which comprises adding to the molten steel during said deoxidizing step an alloy containing 25% to 65% silicon; 5% to 20% vanadium; 1% to 20% zirconium, the total proportion of the metals zirconium and vanadium not exceeding 30%; 1% to 15% aluminum; the remainder principally iron, said alloy being added to said steel in an amount sufficient to raise the silicon content of said steel by about 0.25%.

3. In the process of manufacturing steel welding rods which comprises the steps of preparing a bath of molten steel of substantially the desired composition; deoxidizing the molten bath; and casting the deoxidized steel, the method of imparting to the rods the characteristic of forming weld-deposits of enhanced uniformity of physical properties throughout which comprises adding to the molten steel during said deoxidizing step an alloy containing 25% to 65% silicon; 5% to 20% vanadium; 1% to 20% titanium; the total proportions of the metals titanium and vanadium not exceeding 25%; 1% to 15% aluminum; and the remainder principally iron, said alloy being added to said steel in an amount sufficient to raise the silicon content of said steel by about 0.25%.

4. In the process of manufacturing steel welding rods which comprises the steps of preparing a bath of molten steel of substantially the desired composition; deoxidizing the molten bath; and casting the deoxidized steel, the method of imparting to the rods the characteristic of forming weld-deposits of enhanced uniformity of physical properties throughout which comprises adding to the molten steel during said deoxidizing step an alloy containing 25% to 65% silicon; 5% to 20% zirconium; an aggregate of 1% to 20% aluminum and calcium; the remainder principally iron, said alloy being added to said steel in an amount sufficient to raise the silicon content of said steel by about 0.25%.

5. In the process of manufacturing steel welding rods which comprises the steps of preparing a bath of molten steel of substantially the desired composition; deoxidizing the molten bath; and casting the deoxidized steel, the method of imparting to the rods the characteristic of forming weld-deposits of enhanced uniformity of physical properties throughout which comprises adding to the molten steel during said deoxidizing step an alloy containing 25% to 65% silicon; 5% to 20% titanium; an aggregate of 1% to 20% aluminum and calcium; the remainder principally iron, said alloy being added to said steel in an amount sufficient to raise the silicon content of said steel by about 0.25%.

6. A steel welding rod composed of a steel in the condition produced by the addition thereto while said steel is in the molten state, of a small amount, insufficient to change radically the composition of said steel, of an alloy containing 25% to 65% silicon; 3% to 30% of at least one element selected from the group consisting of titanium, zirconium and vanadium; and 1% to 20% of at least one element selected from the group consisting of aluminum and calcium; the remainder principally iron; said condition insuring a high degree of uniformity of hardness and strength in weld-deposits of such welding rods.

ARTHUR R. LYTLE.